United States Patent [19]

Courtoy et al.

[11] E Patent Number: Re. 33,599

[45] Reissued Date of Patent: May 28, 1991

[54] PROCESS FOR OBTAINING AREAS OF DISTINCTIVE APPEARANCE ON SYNTHETIC COVERINGS AND THE PRODUCT DERIVED THEREFROM

[75] Inventors: Jean-Francois Courtoy, Wiltz; Daniel Marchal, Esch sur Alzette, both of Luxembourg

[73] Assignee: Eurofloor S.A., Luxembourg

[21] Appl. No.: 96,642

[22] Filed: Sep. 11, 1987

Related U.S. Patent Documents

Reissue of:

[64] Patent No.: 4,608,294
Issued: Aug. 26, 1986
Appl. No.: 603,843
Filed: Apr. 25, 1984

[51] Int. Cl.[5] ..... B05D 3/06

[52] U.S. Cl. ..... 428/141; 427/43.1; 427/44; 427/54.1; 427/264

[58] Field of Search ..... 427/43.1, 44, 53.1, 427/54.1, 261, 262, 264; 428/141, 142, 152

[56] References Cited

U.S. PATENT DOCUMENTS

| | | | |
|---|---|---|---|
| 3,310,422 | 3/1967 | Petry . | |
| 4,029,831 | 6/1977 | Daunheimer | 427/264 |
| 4,068,030 | 1/1978 | Witman | 428/159 |
| 4,172,169 | 10/1979 | Mawson et al. | 427/262 |
| 4,187,131 | 2/1980 | Shortway et al. | 427/264 |
| 4,273,819 | 6/1981 | Schmidle et al. | 427/264 |
| 4,491,616 | 1/1985 | Scmidle et al. | 427/44 |

FOREIGN PATENT DOCUMENTS

| | | |
|---|---|---|
| 1061259 | 11/1953 | France . |
| 1538506 | 7/1968 | France . |
| 2235796 | 1/1975 | France . |
| 1159645 | 7/1969 | United Kingdom . |

*Primary Examiner*—Norman Morgenstern
*Assistant Examiner*—Marianne L. Padgett
*Attorney, Agent, or Firm*—Fishman, Dionne & Cantor

[57] ABSTRACT

A process and product is presented for obtaining selective areas of distinctive appearance, i.e., matting on synthetic coverings. This process includes, depositing a polymer coating which contains at least one first initiator for polymerization onto at least a first selected area or zone on an expandable or nonexpandable support substrate. Next, at least one second coating comprised of a crosslinkable monomer containing at least one second polymerization initiator is deposited onto a second selected area on the substrate. This second area or zone may encompass at least a portion of the first area. The first and second initiators should be triggered by distinct "spectral zones", i.e., a range of temperature conditions, frequency conditions, etc. capable of decomposing the initiator to form free radicals or ions needed for chain propagation in a polymerization reaction. Thereafter, pre-gelling is performed on the deposited material followed by a graining operation which is carried out over at least a portion of the substrate surface. The synthetic covering in the first zone or area is then polymerized via the first initiator wherein the particular appearance thereof is fixed to the substrate. Thereafter, gelling is carried out wherein the polymer which has not been fixed by the first initiation polymerization will flow, i.e., fluidize such that the grained appearance in the second area or zone will disappear, i.e., smooth over. This gelling may also cause some expansion of the polymer on the substrate.

40 Claims, 1 Drawing Sheet

PROCESS FOR OBTAINING AREAS OF DISTINCTIVE APPEARANCE ON SYNTHETIC COVERINGS AND THE PRODUCT DERIVED THEREFROM

Matter enclosed in heavy brackets [ ] appears in the original patent but forms no part of this reissue specification; matter printed in italics indicates the additions made by reissue.

BACKGROUND OF THE INVENTION

This invention relates to the field of synthetic coverings. More particularly, this invention relates to a process for manufacturing synthetic coverings and the products obtained thereby. The process of the present invention is particularly well suited for providing selective areas of distinctive appearance, i.e., matting or graining on a synthetic covering surface, particularly floor or wall coverings which are based on synthetic materials, usually polyvinyl chloride (PVC). This invention is related to copending U.S. patent application Ser. No. 603,842, filed the same day as this application, assigned to the assignee hereof and incorporated herein by reference.

The majority of synthetic plastic coverings do not exhibit a sufficient visual difference between glossy areas and matted or grained areas on the surface thereof. A distinct difference between gloss and mattness is desirable on synthetic coverings in order to provide certain distinctive appearances. For example, certain areas on the surface covering may have a design applied by printing or other means, while other areas may have a joint imitation thereon. This is particularly true when a synthetic covering is intended to imitate a ceramic tile flooring. Accordingly, an important feature for many types of synthetic coverings is that selected areas or zones on the surface thereof have a distinctive visual appearance, especially between glossy areas and matted areas.

U.S. Pat. No. 4,273,819 and FR-A-No. 2531009 describe various techniques and methods which are intended to provide local areas on synthetic coverings having distinctive matted appearances. However, both of these prior art patents suffer from certain disadvantages and deficiencies.

SUMMARY OF THE INVENTION

The above discussed and other problems of the prior art are overcome or alleviated by the process and product of the present invention. In accordance with the present invention, a novel process is provided for obtaining selective areas of distinctive appearance, i.e., a matted appearance on the surface of a synthetic covering.

In accordance with the present invention, this improved process includes, depositing a polymeric coating which contains at least one first initiator for polymerization onto at least a first selected area or zone on an expandable or nonexpandable support substrate. Next, at least one second coating comprised of a cross-linkable monomer containing at least one second polymerization initiator is deposited onto a second area on the substrate. This second area or zone may encompass at least a portion of the first area or zone. It will be appreciated that the two initiators should be chemically distinct, so as to be triggered by either different conditions or by different "spectral zones". Thereafter, pre-gelling is preformed on the deposited material followed by a graining operation which is carried out over at least a portion of the substrate surface. The synthetic covering in the first zone or area is then polymerized by the first initiator wherein the particular appearance thereof is fixed to the substrate. Thereafter, gelling is carried out wherein the polymer which has not been fixed by the first initiation polymerization flow, i.e., fluidize such that the grained appearance in the second area or zone will disappear, i.e., smooth over. This gelling may also cause some expansion of the polymer on the substrate.

It will be appreciated that a "spectral zone" is defined as a range of temperature conditions, a range of frequency conditions, and other condition ranges capable of decomposing the initiator so as to form free radicals or ions which are needed for chain propagation in a polymerization reaction.

The process of the present invention desirably permits separate polymerization initiations in the selected areas or zones on the substrate. Thus, depending upon the materials utilized, the polymerization initiation energy supplied to a first zone will not initiate the polymerization of any of the other zones. These separate polymerization conditions thus make it possible to polymerize a selected zone and thereby fix its appearance and thereafter to polymerize a second zone without changes to the distinctive appearance of the first zone.

The above discussed and other advantages of the present invention will be apparent and understood by those skilled in the art from the following detail description and drawing.

BRIEF DISCUSSION OF THE DRAWINGS

Referring now to the drawings wherein like elements are numbered alike in several figures.

DESCRIPTION OF THE PREFERRED EMBODIMENT

Figure 1:
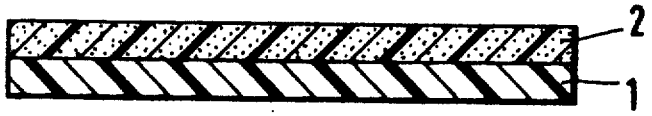
FIG. 1 is a cross-sectional elevation view of a substrate material used in accordance with the process and product of the present invention.

The present invention provides a novel process of achieving distinctive surfaces textures, i.e., matting at the surface of a selected area or zone on a synthetic covering. In accordance with the present invention, this improved process includes, depositing a polymeric coating which contains at least one first initiator for polymerization onto at least a first selected area or zone on an expandable or nonexpandable support substrate. Next, at least one second coating comprised of a cross-linkable monomer containing at least one second polymerization initiator is deposited on a second selected area on the substrate. This second area or zone may encompass at least a portion of the first area. It will be appreciated that the first and second initiators should be chemically distinct so as to be triggered by either different conditions or by different "spectral zones". "Spectral zone" is a term which indicates a range of temperature conditions, a range of frequency conditions, and a range of other conditions which are capable of decomposing the initiator to form free radicals or ions needed for chain propagation in the polymerization reaction. Thereafter, pre-gelling is preformed on the deposited material followed by a graining operation which is carried out over at least a portion of the substrate surface. The synthetic covering in the first zone or area is then polymerized by the first initiator wherein the particular appearance thereof is fixed to the substrate. Thereafter, gelling is carried out wherein the polymer which has not been fixed by the first initiation polymerization flow, i.e., fluidize such that the grained appearance in the second area or zone will disappear, i.e., smooth over. This gelling may also cause some expansion of the polymer on the substrate.

As previously discussed, the present invention is particularly well suited for obtaining different degress of mattness on a synthetic covering. Accordingly, in a variation of the process of the present invention, an ink or an extender containing an ultraviolet radiation polymerization initiator is deposited on an expandable or nonexpandable support in a first zone or area on the synthetic covering. This ink or extender may optionally contain an expansion inhibitor. Next, at least one second coating comprised of a crosslinkable monomer containing a thermal polymerization initiator is deposited onto a second selected area on the substrate. This second area or zone may encompass at least a portion of the first area or zone. Thereafter, pre-gelling is preformed on the deposited material at a temperature such that the decomposition of the thermal initiator is negligible. A graining operation is then carried out over at least a portion of the substrate surface. The synthetic covering in the first zone or area is then polymerized by ultraviolet radiation initiation wherein the particular appearance thereof is fixed to the substrate. Thereafter, gelling is carried out wherein the polymer which has not been fixed by the ultraviolet radiation initiation will flow, i.e., fluidize such that the graining appearance in the second area or zone will disappear. This gelling may also cause some expansion of the polymer on the substrate.

It should be understood that the above discussed process is not limited to thermal initiator and/or ultraviolet initiators. In accordance with the present invention, it is possible to use two distinct thermal initiators having different initiation temperatures, or two ultraviolet initiators having different ultraviolet initiation frequencies. It is also possible to combine the above mentioned initiators with one another or to combine them with other polymerization initiations such as ionic initiators, those initiators in turn, being combined with one another. Accordingly, the process of the present invention permits numerous variations depending upon the particular conditions and results desired.

It will also be appreciated that the first zone or area may be advantageously be a joint between two tiles so as to imitate ceramic tiling. However, the present invention is not limited to such a design and may represent any desired design. Accordingly, the coating or printing of the first zone can be affected on an expandable support or a nonexpandable or slightly expandable support depending upon the desired end product. In the case where the mat effect is desired in the joint area of the covering which imitates ceramic tiling, the ink containing the radiation initiator may also contain an expansion inhibitor. It will be appreciated that conventional expansion inhibitors, preferably trimellitic anhydride (TMA) may be utilized by the present invention.

An important feature of the process and production of the present invention is that the entire surface of the synthetic covering may be grained without necessitating a special graining roller controlled in accordance with the design or decoration of the covering to be utilized. This is because the zone which is not polymerized after graining will be fluidized during the subsequent gelling treatment and will become smooth through surface tension.

By way of example only, cross-linkable monomers suitable for use in connection with the present invention include, but are not limited, to the following compounds: ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate, tetraethylene diacrylate, polyethylene glycol dimethacrylate, polyethylene glycol diacrylate, 1,3-butylene glycol dimethacrylate, 1,4-butylene glycol dimethacrylate, 1,3-butylene glycol diacrylate, 1,4-butylene glycol diacrylate, 1,6-hexanediol dimethacrylate, 1,6-hexanediol diacrylate, neopentyl glycol diacrylate, neopentyl glycol dimethacrylate, (ethoxylated) bis-phenol A dimethacrylate, divinylbenzene, divinyltoluene, trimethylolpropane trimethacrylate, trimethylolpropane triacrylate, pentaerythritol triacrylate, glyceryl trimethacrylate, pentaerythritol tetracrylate and pentaerythritol tetramethacrylate. It will be appreciated that particularly preferred compounds are 1,4-butylene glycol dimethacrylate and trimethylolpropane trimethacrylate (Example 2).

Besides the above listed monomer compounds, which all have at least two propagation sites, monomeric compounds possessing only one propagation site may be added thereto. The coating containing the crosslinkable monomer should contain 1 to 50%, preferably about 11%, by weight of monomer possessing at least two chain propagation sites, optionally mixed with monomers possessing one chain propagation site.

In a preferred embodiment of the present invention, the polymeric coating comprising the second area or zone is a wear layer which is deposited on the support substrate in an amount of 300 g/m$^2$ and consists of a mixture of 100 parts of a base varnish containing:

100 parts of PVC obtained by emulsion polymerization
42 parts of plasticizers (phthalates)
3 parts of stabilizers (barium/zinc) and
15 parts of white spirit,
12.4 parts of an acrylic monomer (ROCRYL 980 - ROHM & HAAS) and 0.1 to 0.3 parts of an 80% strength solution of cumyl hydroperoxide (thermal initiator) in cumene.

By way of example only, and not by limitation, the following thermal initiators may also be used in accordance with the present invention: benzoyl peroxide, diisobutyryl peroxide, 2,4-dichlorobenzoyl peroxide, diisononanoyl peroxide, decanoyl peroxide, lauroyl peroxide, acetyl peroxide, succinic acid peroxide, bis-p-chlorobenzoyl peroxide, 2,5-dihydroperoxy-2,5-dimethylhexane, cumyl hydroperoxide, t-butyl hydroperoxide, p-menthane hydroperoxide, diisopropylbenzene hydroperoxide, 1,1,3,3-tetramethylbutyl hydroperoxide, di-(n-propyl) peroxydicarbonate, diisopropyl peroxydicarbonate, di-(sec. -butyl) peroxydicarbonate, di-(2-ethylhexyl) peroxydicarbonate, bis-(4-t-butylcyclohexyl) peroxydicarbonate, t-butylperoxyisopropyl monocarbonate, 1,1-bis-(t-butyl-peroxy)-3,3-5-trimethylcyclohexane, t-butyl peroxyacetate, t-butyl peroxyisobutyrate, t-butyl peroxy-2-ethylhexanoate, t-butyl peroxypivalate, t-butyl peroxyneodecanoate, t-butyl hydroperoxide, t-butyl-peroxymaleic acid, di-t-butyl diperoxyphthalate, 2,5-dimethyl-2,5-bis-(peroxybenzolyl)-hexane, 2,3-dimethyl-2,5-bis(octanoylperoxy)-hexane, t-butyl peroctoate, t-butyl perbenzoate, acetyl cyclohexylsulphonyl peroxide, acetyl sec.-heptyl-sulphonyl peroxide, methyl ethyl ketone peroxide, 2,4-pentanedione peroxide, cyclo-hexanone peroxide.

Among the above listed thermal initiators, preferred initiators include: 1,1,3,3-tetra-methylbutyl hydroperoxide, cunyl hydroperoxide, 2,5-dimethyl-hexane-2,5-dihydroperoxide, t-butyl hydroperoxide and 2,4-pentanedione peroxide and especially cumyl hydroperoxide used in amounts of at least 0.0001%.

Because a large number of these peroxides exhibit excessive decomposition at conventional processing temperatures, it may be advantageous to add in inhibitors from the decomposition of the thermal initiator. These inhibitors include, but are not limited to the following: benzoic acid, pyridine, phenol, benzyl alcohol, resorcinol, ethylamine, benzylamine, hydroquinone, pyro-catechol and pyrogallol.

It is also possible to use, as initiators, azo compounds of the AIBN (azo-bis-isobutyronitrile) type or inorganic compounds containing a peroxide bond.

The above compounds are chosen in accordance with the particular temperature and pressure conditions employed and in accordance with the rate of production (taking into account the particular kinetics of the system chosen).

Preferable ultraviolet polymerization initiators include DAROCUR® 1173 or DAROCUR® 1116 manufactured by Merck in amounts from 1 to 50%, preferably 20%, by weight of the ink or of the extender. Other compounds include, but are not limited to, the following: benzophenone, 2-chloro-thioxanthone, 2-methyl-thioxanthone, 2-isopropyl-thioxanthone, benzoin, 4,4'-dimethyoxybenzoin, benzoin ethyl ether, benzoin isopropyl ether, benzyldimethylketal, 1,1,1-trichloro-acetophenone, 1-phenyl-1,2-propanedione-2-(ethoxycarbonyl)-oxime, diethoxyacetophenone, dibenzosuberone, DAROCUR® 1398, DAROCUR® 1174 and DAROCUR® 1020. It should be understood that at least two different radiation initiators, in the same zone or in different zones and different layers, may also be used in conjunction with the process of the present invention.

Figure 6:
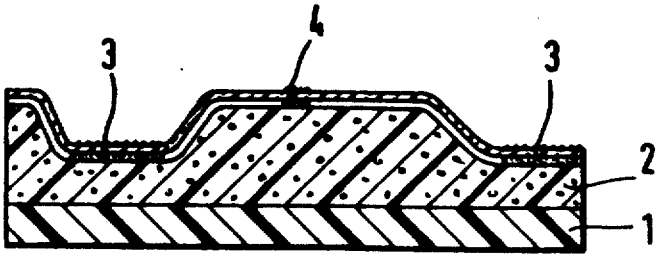
FIG. 6 is a cross-sectional elevation view of the final product provided in accordance with the process of the present invention.

In accordance with one embodiment of the present invention, the synthetic covering may be smoothed by surface tension which is provided during gelling, either by utilizing a mechanical smoothing treatment with a roller or by carrying out a preferably slight hot graining operation. It will be appreciated that another way of accomplishing the smoothing operation is to expose the final synthetic covering as shown in FIG. 6 (for example, when the final product leaves an expansion oven), to infrared radiation so as to assist the smoothing operation of the product surface.

In an alternative embodiment of the present invention, the method of producing a floor or wall covering, is facilitated by polymerizing the monomer at selected intervals. In the alternative embodiment, the second zone may be directly initiated or indirectly initiated by using an agent for energy transfer by radiation, so that each of the initiation stages is triggered by a specific physiochemical effect. In this manner, it is possible to separate the polymerization initiation in the selected zones in accordance with the initiators and/or physiochemical initiation properties. It will be appreciated that the polymerization initiation energy provided by radiation in a first zone should not initiate the polymerization of a second or other zone. This above-described separation of the initiation conditions thus make it possible to polymerize one selected zone and fix its particular appearance and subsequently to polymerize a second zone without deterioration of the appearance of the first zone. Preferably, the initiation of the polymerization of the second zone is by direct radiation or via an energy transfer agent which may be effected by X-rays, an electron beam or gamma radiation. In order for the energy transfer agent to be able to exert its full effects, the agent must act on a covering product in which sufficient mobility of the crosslinkable monomer is assured. This condition is best effected by heating the synthetic covering in an oven, preferably the oven wherein the gelling and/or optional expansion steps are carried out. Alternatively, the energy transfer agent may act on the covering product upon leaving this oven, i.e., while the product is still at a sufficiently high temperature.

In accordance with the above-described embodiment, the polymerization in the first zone can be achieved by the techniques described in the following Examples while the polymerization in the second zone can be provided by suitable physio-chemical means. Moreover, the polymerization of the second zone can be done without major modifications to production lines for existing floor coverings. It will be appreciated that the monomers to be used, the localized application techniques in the various zones, and in general, the overall technological process described above is identical, mutatis mutandis, to that which is described below in the Examples.

It will be understood that the different initiation conditions used in the respective zones or areas must be chosen so as to be sufficiently different in order to achieve a particular desired final effect. Note that it may be difficult to control a process wherein two different ultraviolet initiators, i.e., each being triggered by distinct ultraviolet radiation ranges, were used because the separation of the initiation condition in the ultraviolet spectrum may be difficult to achieve.

It should be understood that the method used for effecting initiation in the second zone by radiation means if, for example, trimethylolpropane trimethacrylate is used as the monomer, is fully described by Salmon and Loan, J. Appl. Polym. Sci., 16, 671 (1972).

When electron beams are used in accordance with the present invention to initiate the polymerization reaction, a preferred apparatus is the ELECTROCURTAIN apparatus manufactured by Ateliers de Charmilles (Energy Sciences International) of Geneva (Switzerland), using sufficient energy to penetrate into the proper depth of the layer which is to be crosslinked, for example, energy on the order of 175 KV for doses of 2 Mrads have been found sufficient.

It will be appreciated that the process of matting in accordance with the present invention may also be applied to relief products produced by silk-screen techniques.

The following four examples provide particular and preferred embodiments of the process and product of the present invention.

EXAMPLE 1

Figure 2:
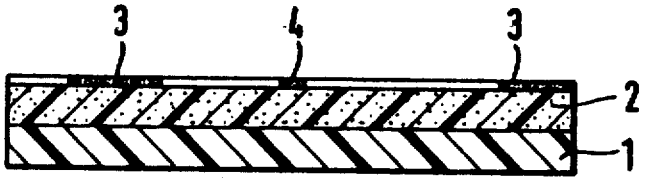
FIG. 2 is a cross-sectional elevation view showing the first step in the process of the present invention.

Referring first to FIG. 1, the support of the synthetic covering preferably consists of a substrate 1 having a coating, in an amount of 500 g/m$^2$, of an expandable or foamable plasticol 2. On this expandable plasticol coating 2, a conventional ink containing an expansion inhibitor and about 20% of the ultraviolet initiator DAROCUR ® 1173 or 1116 is deposited in a first selected area or zone in one or more stages in accordance with the decoration which is an imitation of a tiled joint design 3 (see FIG. 2). An ink containing an ultraviolet initiator is also deposited in accordance with any desired decorative design 4. It will be appreciated that the ink can be replaced by an extender (i.e., a solution without dye stuff or pigment) depending upon the desired decorative effect to be obtained. Preferably, this deposition (of ink or extender) is effected by a photogravure or silk screen technique.

Figure 3:
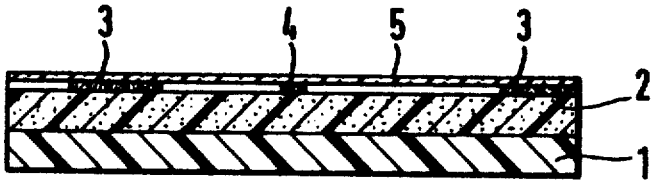
FIG. 3 is a cross-sectional elevation view showing a second step in the process of the present invention wherein a covering has been provided after the second zone has been coated on the substrate.

Referring now to FIG. 3, thereafter, a transparent plasticol coating is deposited over the entire surface to serve as a wear layer 5. This wear layer 5 coating contains an acrylic monomer ROCRYL 980 and the thermal initiator which is preferably cumyl hydroperoxide. Next, pre-gelling is carried out at a temperature such that the decomposition of the thermal initiator is nil or negligible, which is usually between about 100° C. and 160° C.

Figure 4:
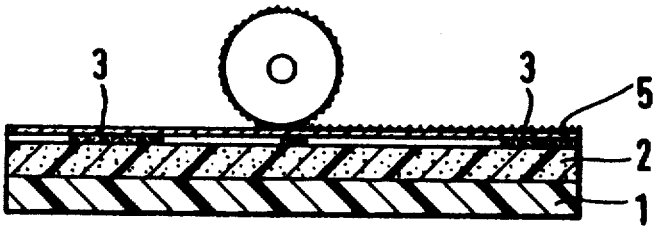
FIG. 4 is a cross-sectional elevation view of a third step in the process of the present invention indicating the graining operation.
Figure 5:
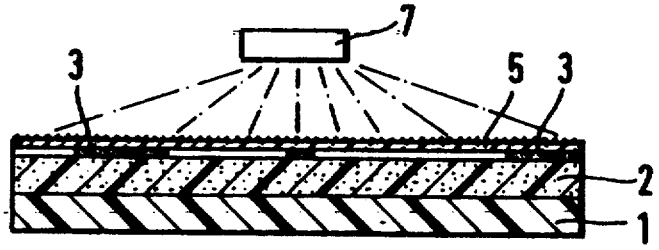
FIG. 5 is a cross-sectional elevation view of a fourth step in the process of the present invention showing polymerization via a radiation initiator.

In FIG. 4, the step of graining the entire surface by means of a graining roll under pressure which depends upon the degree of mattness desired is shown. This graining step is usually conducted at a temperature which prohibits polymerization of the plasticol, usually above 100° C. It will be appreciated that the pre-gelling and graining stages can be carried out in a single stage using a sufficiently heated graining roll. Referring now to FIG. 5, the synthetic covering is passed under an ultraviolet lamp 7 wherein the zone of material containing the ultraviolet initiator is crosslinked so that the grained or matted appearance of this zone is fixed thereby.

Thereafter, the synthetic covering product obtained therefrom is passed for between 1–2 minutes 30 seconds through an oven of about 200° C. wherein the expandable coating 2 is expanded into the areas which do not contain an expansion inhibitor and to polymerize the zone containing the thermal initiator. During this polymerization, the zone which has not been polymerized during the ultraviolet initiation undergoes fluidization which has the effect of smoothing the grained surface, while the zone which has been grained and crosslinked during the ultraviolet initiation retains its grained, i.e., matted, appearance. The resultant final product is shown in FIG. 6.

EXAMPLE 2

The same procedure as used in Example 1 is followed in this Example except that the ink used herein contains 1 to 20% benzoyl peroxide dissolved in a minimum amount of ether or of methyl ethyl ketone.

The coating deposited on the entire surface contains, as in Example 1, the other thermal initiator, i.e., cumyl hydroperoxide. In this case, the desired effect is brought about by making use of the different initiation temperatures of the initiators used.

A first heat treatment (pre-gelling) is in effect carried out at 120° C., and this is followed by a graining operation and finally by a gelling and expansion stage at between 180°–200° C., which can be accompanied by a mechanical smoothing operation.

EXAMPLE 3

The procedure followed is as in Example 2, except that between 1 to 20% of azoisobutyronitrile (AIBN) is dissolved in a minimum amount of methyl ethyl ketone and added to the ink.

EXAMPLE 4

The same procedure as used in Example 1 is followed in this Example, the PVC being replaced by a copolymer of vinyl chloride (95%) and vinyl acetate (5%), all the other components remaining as before.

The following composition was used:

| | Parts by weight |
|---|---|
| VC/VA copolymer resin containing 5% of vinyl acetate | 100.00 |
| Stabilizer (barium/zinc) | 3.00 |
| Monomer (trimethylolpropane trimethacrylate) | 20.00 |
| Plasticizers | 57.00 |
| Deaerating agent | 3.3 |

The pre-gelling is preferably carried out on a drum at 130° C.; although this temperature can be exceeded, depending upon the speed of travel of the covering product. It has been found that the above composition provides better gelling and smoothing.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A process of obtaining areas of distinctive appearance on a synthetic covering, the covering including a support layer, including the steps of:

depositing at least a first polymeric coating having at least one first polymerization initiator [thereon] *therein* onto a first selected [area] *zone* of said support layer;

depositing at least a second [polymeric] coating having at least one second polymerization initiator therein onto a second selected [area] *zone* of said support layer, said first and second polymerization initiators each being comprised of one of a combination of two initiators which decompose under different spectral conditions, said two initiators comprising two of the three initiators selected from the group consisting of thermal initiators, ultraviolet radiation initiators and ionic initiators, at least a portion of said second [polymeric] coating comprising *a polymeric material including* a crosslinkable monomer, *the deposited coatings defining a synthetic covering;* pre-gelling said [deposited coatings] *synthetic covering;* graining *at least* selected areas of said [deposited coatings] *synthetic covering* to form a matted surface;

polymerizing said [first polymeric coating] *synthetic covering in said first zone* via said first initiator wherein said [first polymeric coating] *synthetic covering in said first zone* is fixed to said support layer, and wherein said matted surface on said [first polymeric coating] *synthetic covering in said first zone* is fixed thereon; [and]

gelling [said second polymeric coating] to cause fluidization of said [second polymeric coating] *synthetic covering which has not been fixed by initiation in said first zone* thereby smoothing said matted surface thereon*; and*

*polymerizing said synthetic covering in said second zone via said second initiator wherein said synthetic covering in said second zone is fixed to said support layer.*

2. The process of claim 1 wherein said support layer is non-expandable.

3. The process of claim 1 wherein said support layer is expandable.

4. The process of claim 3 including:

expanding said support layer during gelling.

5. The process of claim 1 including:

depositing said second [polymeric] coating over at least a portion of said first [polymeric] coating.

6. The process of claim [1] *5* wherein:

said first [polymeric] coating [is in the form of] *comprises* an ink or an extender;

said first initiator is an ultraviolet initiator;

said second initiator is a thermal initiator; and wherein said pre-gelling is carried out at a temperature wherein the decomposition of said thermal initiator is negligible.

7. The process of claim 6 wherein said thermal initiator is selected from the group consisting of:

benzoyl peroxide, diisobutyryl peroxide, 2,4-dichlorobenzoyl peroxide, diisononanoyl peroxide, decanoyl peroxide, lauroyl perodide, acetyl peroxide, succinic acid peroxide, bis-p-chlorobenzoyl peroxide, 2,5-dihydroperoxy-2,5-dimethylhexane, cumyl hydroperoxide, t-butyl hydroperoxide, p-menthane hydroperoxide, diisopropylbenzene hydroperoxide, 1,1,3,3-tetramethylbutyl hydroperoxide, di-(n-propyl) peroxydicarbonate, diisopropyl peroxydicarbonate, di-(sec. -butyl) peroxydicarbonate, di-(2-ethylhexyl) peroxydicarbonate, bis-(4-butylcyclohexyl) peroxydicarbonate, t-butylperoxyisopropyl monocarbonate, 1,1-bis-(t-butylperoxy)-3,3-5-trimethylcyclohexane, t-butyl peroxyacetate, t-butyl peroxyisobutyrate, t-butyl peroxy-2-ethylhexanoate, t-butyl peroxypivalate, t-butyl peroxyneodecanoate, t-butyl hydroperoxide, t-butyl-peroxymaleic acid, di-t-butyl diperoxyphthalate, 2,5-dimethyl-2,5-bis(peroxybenzoyl)-hexane, 2,3-dimethyl-2,5-bis(octanoylperoxy) hexane, t-butyl peroctoate, t-butyl perbenzoate, acetyl cyclohexylsulphonyl peroxide, acetyl sec.-heptyl-sulphonyl peroxide, methyl ethyl ketone peroxide, 2,4-pentanedione peroxide, and cyclo-hexanone peroxide.

8. The process of claim 6 wherein:

said second [polymeric] coating contains at least 0.0001% of an 80% strength solution of cumyl hydroperoxide in cumene.

9. The process of claim 6 including:

providing at least one decomposition inhibitor to said thermal initiator.

10. The process of claim 9 wherein said decomposition inhibitor is selected from the group consisting of:

benzoic acid, pyridine, phenol, benzyl alcohol, resorcinol, ethylamine, benzylamine, hydroquinone, pyrocatechol and pyrogallol.

11. The process of claim 1 wherein said first and second initiators include initiators selected from the group consisting of:

AZO compounds of the AIBN (azo-bis-isobutyronitrile) type and inorganic compounds containing a peroxide bond.

12. The process of claim 6 wherein said ultraviolet initiator is at least one of the initiators selected from the group consisting of:

benzophenone, 2-chloro-thioxanthone, 2-methyl-thioxanthone, 2-isopropyl-thioxanthone, benzoin, 4,4'-dimethoxybenzoin, benzoin ethyl ether, benzoin isopropyl ether, benzyldimethylketal, 1,1,1-trichloro-acetophenone, 1-phenyl-1,2-propanedione-2-(ethoxycarbonyl)-oxime, diethoxyacetophenone, dibenzosuberone, DAROCUR® 1398, DAROCUR® 1174, DAROCUR® 1020, DAROCUR® 1116 and DAROCUR® 1173.

13. The process of claim 6 wherein:

said ink or extender comprises between about 1 to about 50 weight percent of ultraviolet initiator.

14. The process of claim 1 wherein:

at least one of said first and second [polymeric] coatings is provided with an expansion inhibitor.

15. The process of claim 14 wherein:

said expansion inhibitor is trimellitic anhydride.

16. The process of claim 6 wherein:

said crosslinkable monomer is a monomer having at least two propagation sites.

17. The process of claim 16 wherein said crosslinkable monomer is at least one of the monomers selected from the group consisting of:

ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate, tetraethylene diacrylate, polyethylene glycol dimethacrylate, polyethylene glycol diacrylate, 1,3-butylene glycol dimethacrylate, 1,4-butylene glycol dimethacrylate, 1,3-butylene glycol diacrylate, 1,4-butylene glycol diacrylate, 1,6-hexanediol dimethacrylate, 1,6-hexanediol diacrylate, neopentyl glycol diacrylate, neopentyl glycol dimethacrylate, (ethoxylated) bis-phenol A dimethacrylate, divinylbenzene, divinyltoluene, trimethylolpropane trimethacrylate, trimethylolpropane triacrylate, pentaerythritol triacrylate, glyceryl trimethacrylate, pentaerythritol tetracrylate and pentaerythritol tetramethacrylate.

18. The process of claim 16 wherein:

said crosslinkable monomer also includes monomer compounds having one propagation site.

19. The process of claim 1 wherein:

said second coating comprises between about 2 to about 50 weight percent of crosslinkable monomer.

20. The process of claim 1 including:

depositing plasticol in accordance with a silk-screen printing process to obtain relief.

21. The process of claim 6 inlcuding:

depositing said ink or extender via a technique selected from the group consisting of photogravure, silk screen and flexographic printing.

22. The process of claim 1 wherein:

said pre-gelling is carried out at a temperature of between about 100 to 160 degrees centigrade.

23. The process of claim 1 wherein:

said graining is carried out at a temperature of about 100 degrees centigrade and a pressure depending upon the amount of mattness to be effected.

24. The process of claim 4 wherein:

said expansion is carried out at about 200 degrees centigrade for between about one minute to about two minutes, 30 seconds.

25. The process of claim 1 wherein:

said pre-gelling and graining stages are carried out simultaneously using a heated graining roller.

26. The process of claim 1 including:

heating said synthetic covering via infrared radiation.

27. The process of claim 1 including:

enhancing said fluidization by use of a mechanical treatment.

28. The process of claim 27 wherein said mechanical treatment is selected from the group consisting of a smooth roller and a textured roller.

29. The process of claim 1 wherein:

at least two radiation initiators are utilized in the same or different coatings.

30. The process of claim 29 [wherein] *including:* triggering each radiation initiator via a physiochemical effect specific to said initiator either directly or via a radiation energy transfer agent.

31. The process of claim 29 wherein:

the polymerization initiation energy provided by radiation in said first [coating] *zone* does not initiate polymerization in said [other coatings] *second zone.*

32. The process ot claim 30 wherein:

said radiation initiator is triggered by a physiochemical effect selected from the group consisting of X-rays, electron beam and gamma radiation.

33. The process of claim 30 wherein:

said radiation energy agent triggers said radiation initiator in a hot oven.

34. The process of claim 1 wherein:

at least a portion of said support layer comprises a plastisol.

35. The process of claim 1 wherein:

said second [polymeric] coating includes a transparent plastisol coating to act as a wear layer.

36. The synthetic covering derived from *a* process of obtaining areas of distinctive appearance on a synthetic covering, the covering including a support layer, including the steps of:

depositing at least a first polymeric coating having at least one first polymerization initiator therein onto a first selected [area] *zone* of said support layer;

depositing at least a second [polymeric] coating having at least one second polymerization initiator therein onto a second selected [area] *zone* of said support layer, said first and second polymerization initiators each being comprised of one of a combination of two initiators which decompose under different spectral conditions, said two initiators comprising two of the three initiators selected from the group consisting of thermal initiators, ultraviolet radiation initiators and ionic initiators, at least a portion of said second [polymeric] coating comprising *a polymeric material including* a crosslinkable monomer, *the deposited coatings defining a synthetic covering;* pre-gelling said [deposited coatings] *synthetic covering;* graining *at least* selected areas of said [deposited coating] *synthetic covering* to forms a matted surface;

polymerizing said [first polymeric coating] *synthetic covering in said first zone* via said first initiator wherein said [first polymeric coating] *synthetic covering in said first zone* is fixed to said support layer, and wherein said matted surface on said [first polymeric coating] *synthetic covering in said first zone* is fixed thereon; [and]

gelling [said second polymeric coating] to cause fluidization of said [second polymeric coating] *synthetic covering which has not been fixed by initiation in said first zone* thereby smoothing said matted surface thereon*; and*

*polymerizing said synthetic covering in said second zone via said second initiator wherein said synthetic covering in said second zone is fixed to said support layer.*

*37. A process of obtaining areas of distinctive appearance on a synthetic covering, the covering including a support layer, including the steps of:*

*depositing at least a first polymeric coating having at least one first polymerization initiator therein onto a first selected zone of said support layer;*

*depositing at least a second coating having at least one second polymerization initiator therein onto a second selected zone of said support layer, said second zone at least partially covering said first zone, said first and second polymerization initiators each being comprised of one of a combination of two initiators which decompose under different spectral conditions, said two initiators comprising two of the three initiators selected from the group consisting of thermal initiators, ultraviolet radiation initiators and ionic initiators, at least a portion of said second coating comprising a polymeric material including a crosslinkable monomer, the deposited coatings defining a synthetic covering;*

*pre-gelling said synthetic covering;*

*graining at least selected areas of said synthetic covering to form a matted surface;*

*polymerizing said synthetic covering in said first zone via said first initiator wherein said synthetic covering in said first zone is fixed to said support layer, and wherein said matted surface on said synthetic covering in said first zone is fixed thereon;*

*gelling to cause fluidization of said synthetic covering which has not been fixed by initiation in said first zone thereby smoothing said matted surface thereon; and*

*polymerizing said synthetic covering in said second zone via said second initiator wherein said synthetic covering in said second zone is fixed to said support layer.*

*38. The synthetic covering derived from a process of obtaining areas of distinctive appearance on a synthetic covering, the covering including a support layer including the steps of:*

*depositing at least a first polymeric coating having at least one first polymerization initiator therein onto a first selected zone of said support layer;*

*depositing at least a second coating having at least one second polymerization initiator therein onto a second selected zone of said support layer, said second zone at least partially covering said first zone, said first and second polymerization initiators each being comprised*

*of one of a combination of two initiators which decompose under different spectral conditions, said two initiators comprising two of the three initiators selected from the group consisting of thermal initiators, ultraviolet radiation initiators and ionic initiators, at least a portion of said second coating comprising a cross-linkable monomer, the deposited coatings defining a synthetic covering;*

*pre-gelling said synthetic covering;*

*graining at least selected areas of said synthetic covering to form a matted surface;*

*polymerizing said synthetic covering in said first zone via said first initiator wherein said synthetic covering in said first zone is fixed to said support layer, and wherein said matted surface on said synthetic covering in said first zone is fixed thereon;*

*gelling to cause fluidization of said synthetic covering which has not been fixed by initiation in said first zone thereby smoothing said matted surface thereon; and*

*polymerizing said synthetic covering in said second zone via said second initiator wherein said synthetic covering in said second zone is fixed to said support layer.*

*39. A process of obtaining areas of distinctive appearance on a synthetic covering, the covering including a support layer, including the steps of:*

*depositing at least a first coating having at least one first polymerization initiator therein onto a first selected zone of said support layer, said first coating comprising an ink or extender;*

*depositing at least a second coating having at least one second polymerization initiator therein onto a second selected zone of said support layer, said second zone at least partially covering said first zone, said first and second polymerization initiators each being comprised of one of a combination of two initiators which decompose under different spectral conditions, said two initiators comprising two of the three initiators selected from the group consisting of thermal initiators, ultraviolet radiation initiators and ionic initiators, at least a portion of said second coating comprising a cross-linkable monomer, the deposited coatings defining a synthetic covering;*

*pre-gelling said synthetic covering;*

*graining at least selected areas of said synthetic covering to form a matted surface;*

*polymerizing said synthetic covering in said first zone via said first initiator wherein said synthetic covering in said first zone is fixed to said support layer, and wherein said matted surface on said synthetic covering in said first zone is fixed thereon;*

*gelling to cause fluidization of said synthetic covering which has not been fixed by initiation in said first zone thereby smoothing said matted surface thereon; and*

*polymerizing said synthetic covering in said second zone via said second initiator wherein said synthetic covering in said second zone is fixed to said support layer.*

*40. The synthetic covering derived from a process of obtaining areas of distinctive appearance on a synthetic covering, the covering including a support layer including the steps of:*

*depositing at least a first coating having at least one first polymerization initiator therein onto a first selected zone of said support layer, said first coating comprising an ink or extender;*

*depositing at least a second coating having at least one second polymerization initiator therein onto a second selected zone of said support layer, said second zone at least partially covering said first zone, said first and second polymerization initiators each being comprised of one of a combination of two initiators which decompose under different spectral conditions, said two initiators comprising two of the three initiators selected from the group consisting of thermal initiators, ultraviolet radiation initiators and ionic initiators, at least a portion of said second coating comprising a cross-linkable monomer, the deposited coatings defining a synthetic covering;*

*pre-gelling said synthetic covering;*

*graining selected areas of said synthetic covering to form a matted surface;*

*polymerizing said synthetic covering in said first zone via said first initiator wherein said synthetic covering in said first zone is fixed to said support layer, and wherein said matted surface on said synthetic covering in said first zone is fixed thereon;*

*gelling to cause fluidization of said synthetic covering which has not been fixed by initiation in said first zone thereby smoothing said matted surface thereon; and*

*polymerizing said synthetic covering in said second zone via said second initiator wherein said synthetic covering in said second zone is fixed to said support layer.*

* * * * *